United States Patent
Fuchs

(10) Patent No.: US 11,286,970 B2
(45) Date of Patent: Mar. 29, 2022

(54) CORNER CONNECTION FOR SUPPORT ELEMENTS OF A CABLEWAY CABIN

(71) Applicant: ROPETRANS AG, Rotkreuz (CH)

(72) Inventor: Christoph Fuchs, Schwarzenberg (CH)

(73) Assignee: ROPETRANS AG, Rotkreuz (CH)

( * ) Notice: Subject to any disclaimer, the term of this patent is extended or adjusted under 35 U.S.C. 154(b) by 208 days.

(21) Appl. No.: 16/644,705

(22) PCT Filed: Sep. 5, 2018

(86) PCT No.: PCT/EP2018/073892
§ 371 (c)(1),
(2) Date: Mar. 5, 2020

(87) PCT Pub. No.: WO2019/048494
PCT Pub. Date: Mar. 14, 2019

(65) Prior Publication Data
US 2020/0283035 A1   Sep. 10, 2020

(30) Foreign Application Priority Data
Sep. 6, 2017   (CH) ......................... 108/17

(51) Int. Cl.
*F16B 9/00*   (2006.01)
*B61B 12/00*   (2006.01)
(Continued)

(52) U.S. Cl.
CPC .............. *F16B 9/01* (2018.08); *B61B 12/002* (2013.01); *B61D 17/043* (2013.01); *F16B 7/0446* (2013.01); *F16B 11/008* (2013.01)

(58) Field of Classification Search
CPC ...... B61D 17/00; B61D 17/04; B61D 17/043; F16B 9/01; F16B 11/006; F16B 11/008; F16B 7/0446; F16B 7/00; B61B 12/002
See application file for complete search history.

(56) References Cited

U.S. PATENT DOCUMENTS 2,923,542 A * 2/1960 Clark ..................... B29C 65/56
269/296
4,655,144 A * 4/1987 Freeh .................... B60J 5/0497
105/149.1
(Continued)

FOREIGN PATENT DOCUMENTS

CH          626 842 A5    12/1981
CN        205686486 U    11/2016
(Continued)

OTHER PUBLICATIONS

International Search Report, issued in PCT/EP2018/073892, dated Dec. 14, 2018.
(Continued)

*Primary Examiner* — Zachary L Kuhfuss
*Assistant Examiner* — Cheng Lin
(74) *Attorney, Agent, or Firm* — Birch, Stewart, Kolasch & Birch, LLP

(57) ABSTRACT

A corner connection is provided between support elements of a cableway cabin. The corner connection has a support element (1), designed as an elongated strut having a hollow end (2), and an angled connecting element (3) having a connecting piece (4). The connecting piece (4) is insertable into the hollow end (2) of the support element (1) in a form-fitting manner. An inner shape of the hollow end (2) and an outer shape of the connecting piece (4) have an angular design. At least two oppositely situated surfaces of the hollow end (2) and the connecting piece (4) are provided in a form-fitting manner in such a way that a gap (14, 14') remains between the inner surface (10, 10') of the hollow end (2) and the outer surface (9, 9') of the connecting piece (4), wherein an adhesive material is provided in the gap (14, 14').

9 Claims, 3 Drawing Sheets

Figure 1:
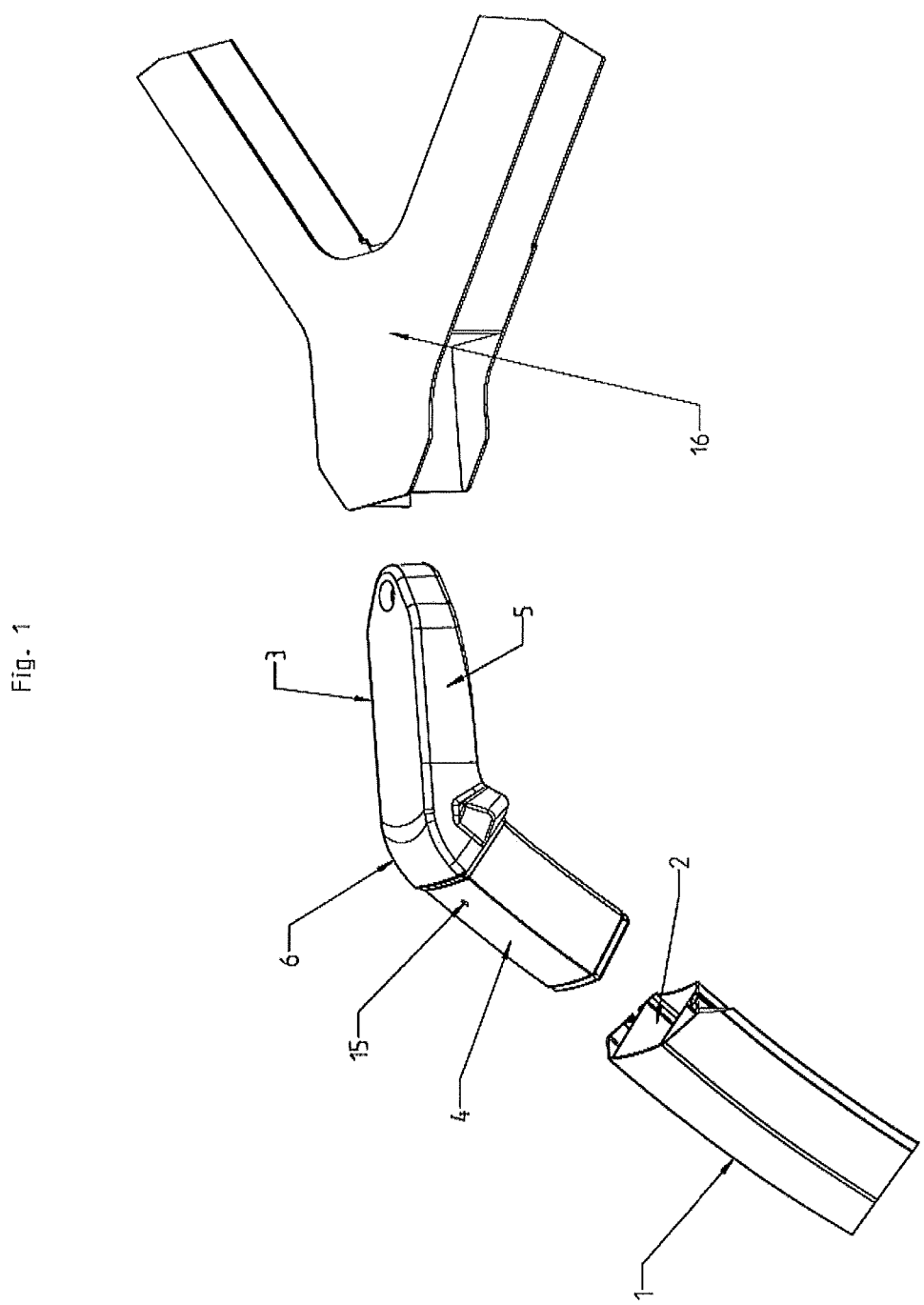

(51) Int. Cl.
*B61D 17/04* (2006.01)
*F16B 11/00* (2006.01)
*F16B 7/04* (2006.01)

(56) References Cited

U.S. PATENT DOCUMENTS

| | | | | | |
|---|---|---|---|---|---|
| 4,943,180 | A | * | 7/1990 | Durhman | E01F 13/00 403/295 |
| 5,143,471 | A | * | 9/1992 | Spinner | B62K 19/28 403/190 |
| 5,427,198 | A | * | 6/1995 | Walsh | B29C 66/52241 182/46 |
| 2006/0005476 | A1 | * | 1/2006 | Riser | B61B 12/002 52/79.9 |

FOREIGN PATENT DOCUMENTS

| | | | |
|---|---|---|---|
| DE | 199 29 057 A1 | 12/2000 | |
| DE | 19929057 A1 * | 12/2000 | ........... B62D 27/026 |
| DE | 10 2014 014 768 A1 | 4/2016 | |
| DE | 10 2015 015 895 A1 | 6/2017 | |
| DE | 102015015895 A1 * | 6/2017 | ........... E06B 3/9682 |
| EP | 1 619 099 A1 | 1/2006 | |
| WO | WO 84/04283 A1 | 11/1984 | |

OTHER PUBLICATIONS

Chinese Office Action and Search Report (including an English translation thereof) issued in the corresponding Chinese Patent Application No. 201880055727.6 dated Nov. 2, 2021.

* cited by examiner

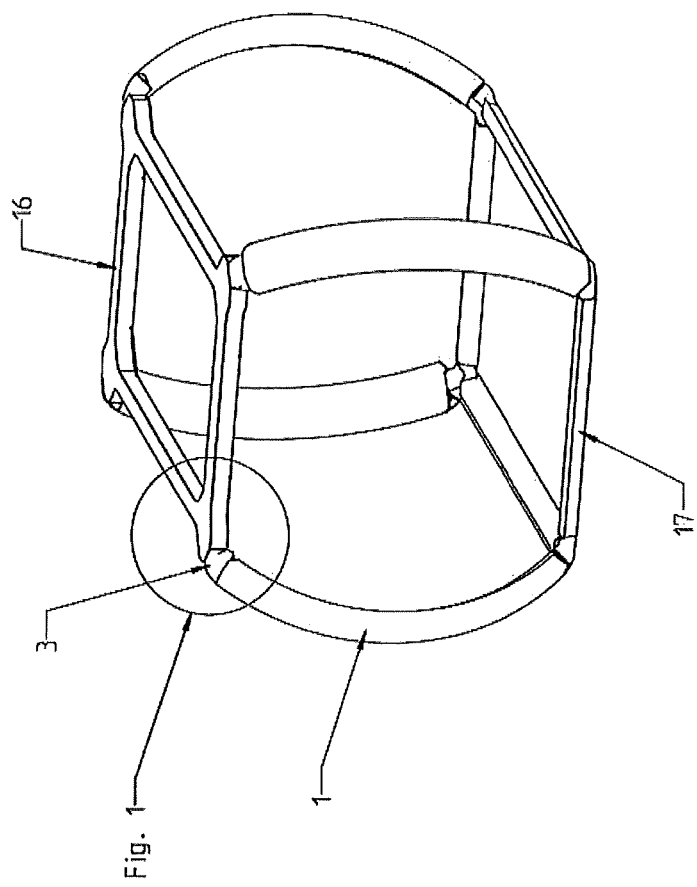

CORNER CONNECTION FOR SUPPORT ELEMENTS OF A CABLEWAY CABIN

The invention relates to a corner connection for support elements of a cableway cabin, in particular cableway cabins that are used in extreme cold or heat, according to the preamble of Claim 1.

Cableway cabins, such as those described in CH 626842, for example, must withstand extreme weather conditions, from severe cold in winter sports areas to intense heat under the sun. Support elements of the cableway cabin are often situated on the outer surface of the cabin, and are therefore particularly exposed to these conditions. In addition, the cabins are subject to high fatigue stress. At the same time, they form the supporting frame of the cabin and are therefore subject to stringent safety requirements, for example a service life of at least 30 years.

For securely connecting supporting elements of the cableway cabin, corner connection pieces are known that connect support elements to one another via a corner in order to ensure a stable supporting frame. The angled corner connection piece is generally inserted with each of its ends into a support element and then screwed, riveted, or welded thereto.

In addition, a corner connection part is known from EP 1619099 A2, having mutually angled connecting pieces that are each pressed into an end of a support element in a form-fit manner. The outer diameter of a connecting piece has a conical design, and is coordinated with the inner diameter of the support element in such a way that after the pressing, a force-fit connection results between the connecting piece and the support element that holds the connecting piece securely in the support element. Additional securing elements such as screws or rivets are not necessary.

In addition, it is known from EP 1619099 A2 that a connecting piece has a cylindrical shape whose outer diameter is only slightly smaller than the inner diameter of a support element into which it is inserted. In this variant, the connecting piece, after an end section having a slightly smaller diameter, has a constriction with an even smaller diameter. After the support element and the connecting piece are joined, the area of the constriction may be filled with an elastic adhesive. For introducing the adhesive, the support element or the connecting piece may have an opening through which the adhesive is injected into the space between the inner diameter of the support element and the outer diameter of the constriction. The opening is subsequently closed with a screw. Establishing such a connection requires numerous work steps, and is therefore complicated and costly.

The object of the present invention, therefore, is to provide a corner connection for cableway cabins that can be easily and quickly manufactured, withstands extreme conditions, and ensures a safe design of the cableway cabin.

This object is achieved according to the invention by a corner connection according to Claim 1 and a cableway cabin according to Claim 13. Advantageous designs and various embodiments of the invention are set forth in the subclaims.

A corner connection between support elements of a cableway cabin according to the present invention has at least one support element, for example in the form of an elongated strut, and an angled connecting element having a connecting piece. The support element, at least on one end, has a tubular design with a hollow end. The connecting piece of the connecting element is insertable into the hollow end of the support element in a form-fitting manner. The hollow end and the connecting piece thus form a form-fit plug-in connection. According to the invention, an inner shape of the hollow end and an outer shape of the connecting piece have an angular design. At least two oppositely situated surfaces of the connecting piece and the hollow end are provided in a form-fitting manner in such a way that a gap remains between the inner surface of the hollow end and the outer surface of the connecting piece. Three oppositely situated surfaces of the connecting piece and the hollow end preferably form such a gap. The inner surface of the hollow end and the outer surface of the connecting piece do not have to rest on one another on all sides of the form-fit connection. An adhesive material is provided in the gap between the oppositely situated sides of the hollow end and the connecting piece. The inner surface of the hollow end and the outer surface of the connecting piece thus form bonding surfaces of the corner connection, and fixedly bond the support element and the connecting element to one another, at least on oppositely situated circumferential sides. Preferably two gaps are provided which are situated at opposite inner and outer surfaces of the hollow end and the connecting piece, respectively.

At least one surface of the hollow end or the connecting piece preferably has a hole that leads to at least one gap and is used for introducing adhesive material. The adhesive material may be easily introduced, preferably injected, into the gaps through the at least one hole. A single hole is advantageously provided, via which the gaps are symmetrically filled with adhesive material. The adhesive material provides reliable fixing of the connecting element in the support element, which may be adapted to certain requirements for the cableway cabin by an appropriate selection of adhesive material.

As an alternative to at least one hole in an outer surface of the connecting piece, the gap between the connecting piece and the hollow end may be accessible from the end area of the hollow end and filled with adhesive material.

According to one embodiment of the corner connection according to the invention, the outer shape of the connecting piece and the inner shape of the hollow end have a quadrangular design. The cross sections of the hollow end and the connecting piece preferably have a trapezoidal design. Bonding surfaces are preferably provided on at least three sides of the trapezoid. Such a contour of the hollow end and the connecting piece provides excellent positioning between the support element and the connecting element, and may serve as anti-twist protection.

The connecting element has the connecting piece on one end. The connecting element may be designed as a support element on the other end. Alternatively, the other end may likewise form a connecting piece for joining a further support element. The connecting element may also have three or four ends, wherein the ends may each be provided as a support element or as a connecting piece.

Between the connecting piece and an end opposite from the connecting piece, the connecting element has an angle, for example, between 0° and 135°, preferably between 30° and 90°. In addition, the hollow end of the support element and the connecting piece of the connecting element advantageously overlap at least over a length of 50 mm, preferably at least 100 mm, when the connecting piece is inserted into the hollow end. The inner surface of the hollow end and the outer surface of the connecting piece, which form bonding surfaces, have at least a surface area, for example, of 10,000 $mm^2$, preferably at least 20,000 $mm^2$. These dimensions provide secure fixing of the support element and the connecting element.

In one preferred embodiment of the corner connection, the connecting element and the support element have a hollow design. Electrical lines may thus be led through the support structure of the cableway cabin.

The connecting piece advantageously has a U-shaped design, and is thus open on one side. The interior of the connecting element is easily accessible through the open side, for example for inserting cables or other lines. The insertion hole is advantageously provided for introducing adhesive material into the gaps through a hole in a U base situated between U legs (7, 7') of the U-shaped connecting piece (4). Thus, in this embodiment it is not necessary to provide a hole on the outer side of the hollow end, since adhesive material may be introduced through the open end of the hollow end and the insertion hole, between the hollow end and the connecting piece.

In one advantageous embodiment of a corner connection according to the present invention, the hollow end has an inner longitudinal surface on whose longitudinal areas a depression extends in each case. The depressions are dimensioned so that edges of the connecting piece come to rest in the depressions in such a way that the connecting piece is centered in the hollow end. Two symmetrical gaps thus remain between the oppositely situated inner surfaces of the hollow end and the outer surfaces of the connecting piece. The depressions of the inner longitudinal surface are preferably spaced apart from the adjacent inner surfaces of the hollow end that form the bonding surfaces. In this embodiment, the outer surfaces of the U legs of the U-shaped connecting piece form the bonding surfaces of the connecting element, and the ends of the U legs come to rest in the depressions of the hollow end. The ends of the U legs may be beveled to allow better sliding and centering in the depressions.

A cable may be easily inserted between the U legs, and together with the connecting piece may be introduced into the hollow end. This is possible not only during the initial installation, but also at any other time, such as for maintenance operations for a cableway that is in operation. The ends of the U legs are inserted into the support element along the depressions. The U base of the connecting piece may thus rest against the surface of the hollow end situated opposite from the surface having the depressions. In the inserted state, the connecting piece of the connecting element is centered in the hollow end of the support element, so that a gap remains on opposite sides, between the connecting element and the support element. Adhesive may now be introduced into the gap by injection, for example, in order to fixedly join the support element and the connecting element together.

The invention further encompasses a cableway cabin having a corner connection described above.

Figure 2:
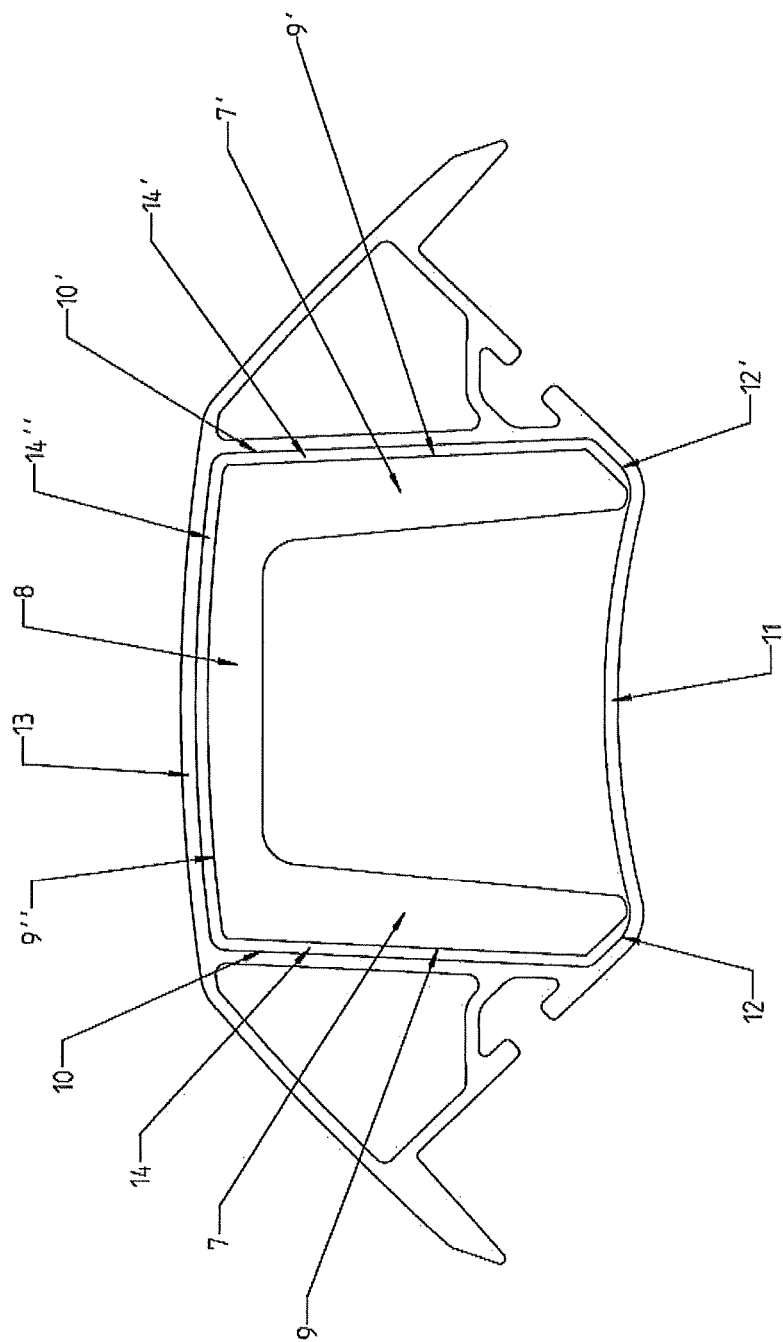

The invention is described below with reference to the figures, which are used solely for explanation and are not to be construed as limiting. Features of the invention that become apparent from the drawings are regarded as part of the disclosure of the invention. In the drawings:

FIG. 1 shows a three-dimensional, partially transparent view of a corner connection according to the present invention, FIG. 2 shows a cross section of the corner connection according to FIG. 1, and FIG. 3 shows a frame of a cableway cabin having a corner connection according to the present invention.

FIG. 1 shows a corner connection as used according to the invention between support elements of a cableway cabin. The corner connection includes a support element 1 having a hollow end 2, and an angled connecting element 3 having a connecting piece 4. The connecting element 3 on its end opposite from the connecting piece 4 has a connection fitting 5 that may be connected to a roof frame 16 of the cableway cabin. The connecting piece 4 and the connection fitting 5 are joined together via an angled area 6. The angled area 6 defines the angle of the corner connection of the support element 1 and the connecting element 3. In other variants of a corner connection according to the invention, instead of the connection fitting 5 a support element strut or a further connecting piece 4 may be provided on the connecting element 3. A hole 15 for introducing adhesive material is provided in a surface of the connecting piece 4.

FIG. 2 shows a cross section of the hollow end 2 of the support element 1 together with the inserted connecting piece 4 of the connecting element 3, the connecting piece 4 being inserted into the hollow end 2 in a form-fitting manner. It is apparent that an inner shape of the hollow end 2 and an outer shape of the connecting piece 4 have an angular design, namely, quadrangular with an isosceles trapezoidal shape. Other angular shapes are also possible in principle.

Furthermore, it is apparent that the connecting element 3 has a U-shaped design, and is hollow between its U legs 7 and 7' and the U base 8. The connecting piece 4 is open on the side opposite from the U base 8, as the result of which the interior of the connecting element 3 is accessible. The U legs 7 and 7' form two oppositely situated outer surfaces 9 and 9', and the U base 8 forms an outer surface 9" that is joined to the surfaces 9 and 9'. The U base 8 has the hole 15 for introducing adhesive material (not shown in FIG. 2).

The hollow end 2 has two oppositely situated inner surfaces 10 and 10' which form the legs of the trapezoid. A base surface 11 of the hollow end 2 extending in the longitudinal direction has a depression 12 and 12' on each of its outer longitudinal areas, the depressions being designed essentially as a furrow in the base surface 11. The depressions 12 and 12' are spaced apart from the adjacent inner surfaces 10 and 10'. A surface 13 having an inner surface 10" extends opposite from the base surface 11, essentially parallel to the base surface 11, so that the inner surfaces 10, 10', and 10" and the base surface 11 form a hollow end 2 with a closed circumference. However, the hollow end 2 is open at its end so that the connecting element 3 may be inserted.

The outer surfaces 9, 9', and 9" of the connecting piece 3 are provided in a form-fitting manner in such a way that a gap 14, 14', or 14" that is accessible in each case from the end of the support element 1 remains between an inner surface 10, 10', or 10" of the hollow end 2 and an outer surface 9, 9', or 9" of the connecting piece 4. An adhesive material that fixedly joins the support element 1 and the connecting element 3 together is provided in the gap. The outer surfaces 9, 9', and 9" and the inner surfaces 10, 10', and 10" thus form bonding surfaces of the corner connection. For example, one- or two-component adhesive may be used as adhesive material. The adhesive material may be introduced through the hole 15, and is distributed on both sides in the gaps 14, 14', and 14" between the inner surfaces 10, 10', and 10" and the outer surfaces 9, 9', and 9".

The ends of the U legs 7 and 7' protrude into the depressions 12 and 12'. The U base 8 comes to rest on the oppositely situated surface 13 of the hollow end 2. The depressions 12 and 12' and the surface 13 opposite therefrom form a guide for the connecting piece 4 inside the hollow end 2. Due to the guiding inside the hollow end 2, the connecting piece 4 is centered in such a way that the two gaps 14 and 14' have at least approximately the same width.

The angle between the longitudinal axis of the connection fitting 5 and the longitudinal axis of the connecting piece 4 is approximately 60° in the present embodiment. However, other angles may also be provided in principle. The bonding surfaces extend over the entire length of the connecting piece 4 and over the width of the inner surfaces 10, 10', and 10".

FIG. 3 shows a frame of a cableway cabin in which a corner connection according to the present invention is used at the eight corners. The support elements 1 are connected to the roof frame 16 via the connecting elements 3. The base frame 17 is connected to the support elements 1 in an analogous manner.

A corner connection according to the present invention allows the support elements of the frame of a cableway cabin to be rapidly fixed to one another or to other elements of the cabin. The shape of the mutually fitting support elements and connecting elements ensures a secure orientation of the support element and the connecting element relative to one another, and prevents rotation of the elements with respect to one another. The adhesive material may be quickly and effectively introduced into the gaps. It has been shown that adhesive bonding on three sides of the corner connection allows reliable fixing.

LIST OF REFERENCE NUMERALS

1 support element
2 hollow end
3 connecting element
4 connecting piece
5 fitting
6 angled area
7, 7' U leg
8 U base
9, 9', 9" outer surface
10, 10', 10" inner surface
11 base surface
12, 12' depression
13 surface
14, 14', 14" gap
15 hole
16 roof frame
17 base frame

The invention claimed is:

1. A corner connection between supporting elements of a cableway cabin, wherein the corner connection comprises a support element, which is designed as an elongated strut having a hollow end and an angled connecting element having a connecting piece, and which is insertable into the hollow end of the support element in a form-fitting manner, characterized in that an inner shape of the hollow end and an outer shape of the connecting piece have an angular design, and at least two oppositely situated surfaces are provided in a form-fitting manner in such a way that a gap remains between the inner surface of the hollow end and the outer surface of the connecting piece, wherein an adhesive material is provided in the gap, wherein the connecting piece has a U-shaped design with three outer surfaces, which are used as bonding surfaces, and wherein a hole is situated between U legs of the U-shaped connecting piece, which is provided for introducing the adhesive material into a U base of the U-shaped connecting piece.

2. The corner connection according to claim 1, characterized in that at least one surface of each of the hollow end and the connecting piece has a hole leading to at least one gap and is used for introducing adhesive material.

3. The corner connection according to claim 1, characterized in that the outer shape of the connecting piece and the inner shape of the hollow end have a quadrangular design.

4. The corner connection according to claim 1, characterized in that the connecting element has the connecting piece on one end, and on the other end forms a support element or fitting and/or has a connecting piece on multiple ends.

5. The corner connection according to claim 1, characterized in that the inner surface of the hollow end and the outer surface of the connecting piece form bonding surfaces having a surface area of at least 50,000 mm$^2$.

6. The corner connection according to claim 1, characterized in that the connecting element has a hollow design.

7. The corner connection according to claim 1, characterized in that the hollow end has an inner longitudinal surface on whose longitudinal areas a depression extends in each case, the depression being dimensioned so that edges of the connecting piece come to rest in the depressions in such a way that the connecting piece is centered in the hollow end.

8. The corner connection according to claim 1, characterized in that a plurality of depressions of the hollow end are spaced apart from the inner surfaces of the hollow end and the ends of U legs of the U-shaped connecting piece come to rest in the depressions of the hollow end.

9. A cableway cabin with a corner connection according to claim 1.

* * * * *

UNITED STATES PATENT AND TRADEMARK OFFICE
CERTIFICATE OF CORRECTION

| | | |
|---|---|---|
| PATENT NO. | : 11,286,970 B2 | |
| APPLICATION NO. | : 16/644705 | |
| DATED | : March 29, 2022 | |
| INVENTOR(S) | : Christoph Fuchs | |

It is certified that error appears in the above-identified patent and that said Letters Patent is hereby corrected as shown below:

On the Title Page

Item (30):
Change:
"(30) Foreign Application Priority Data
Sep. 6, 2017 (CH) ................................ 108/17"

To:
-- (30) Foreign Application Priority Data
Sep. 6, 2017 (CH) ................................ 01108/17 --

Signed and Sealed this
Twenty-first Day of June, 2022

*Katherine Kelly Vidal*

Katherine Kelly Vidal
*Director of the United States Patent and Trademark Office*